Patented Aug. 7, 1934

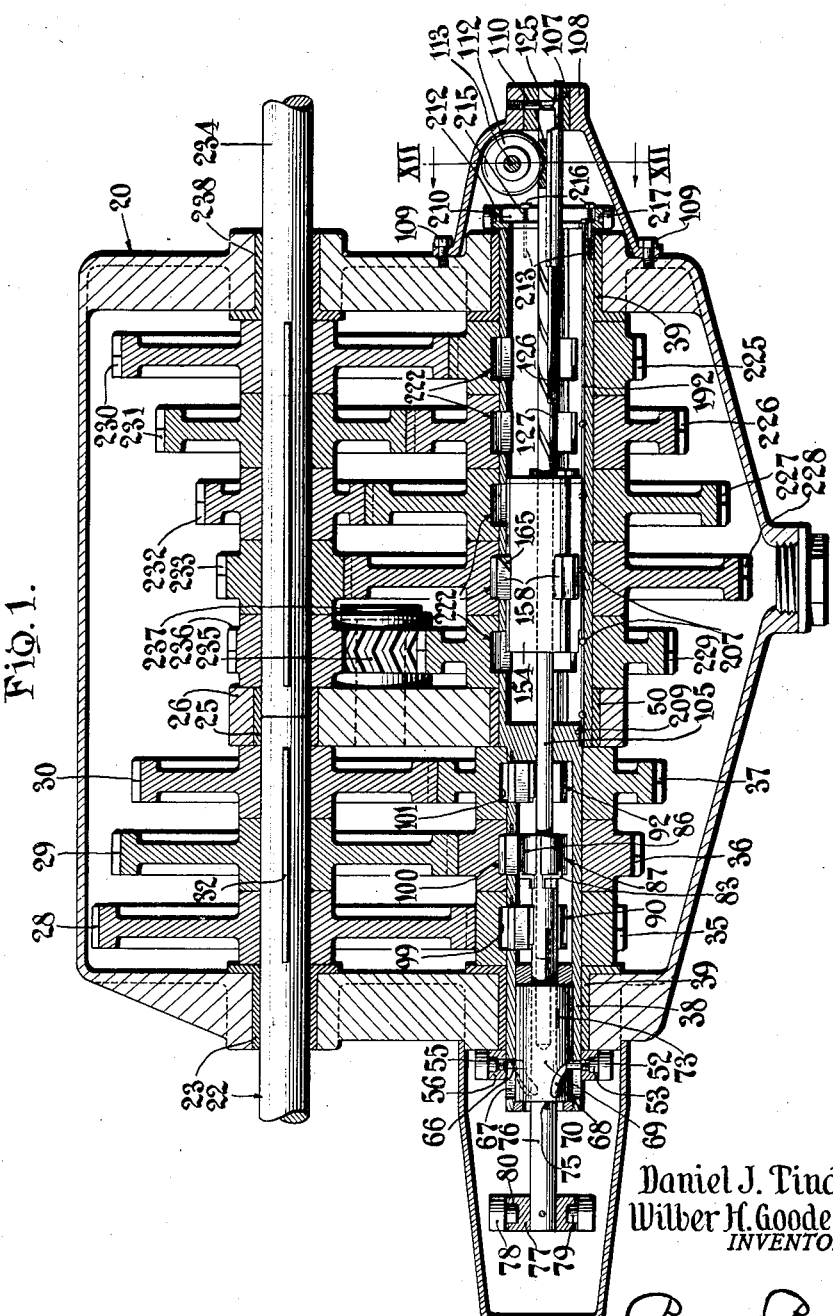

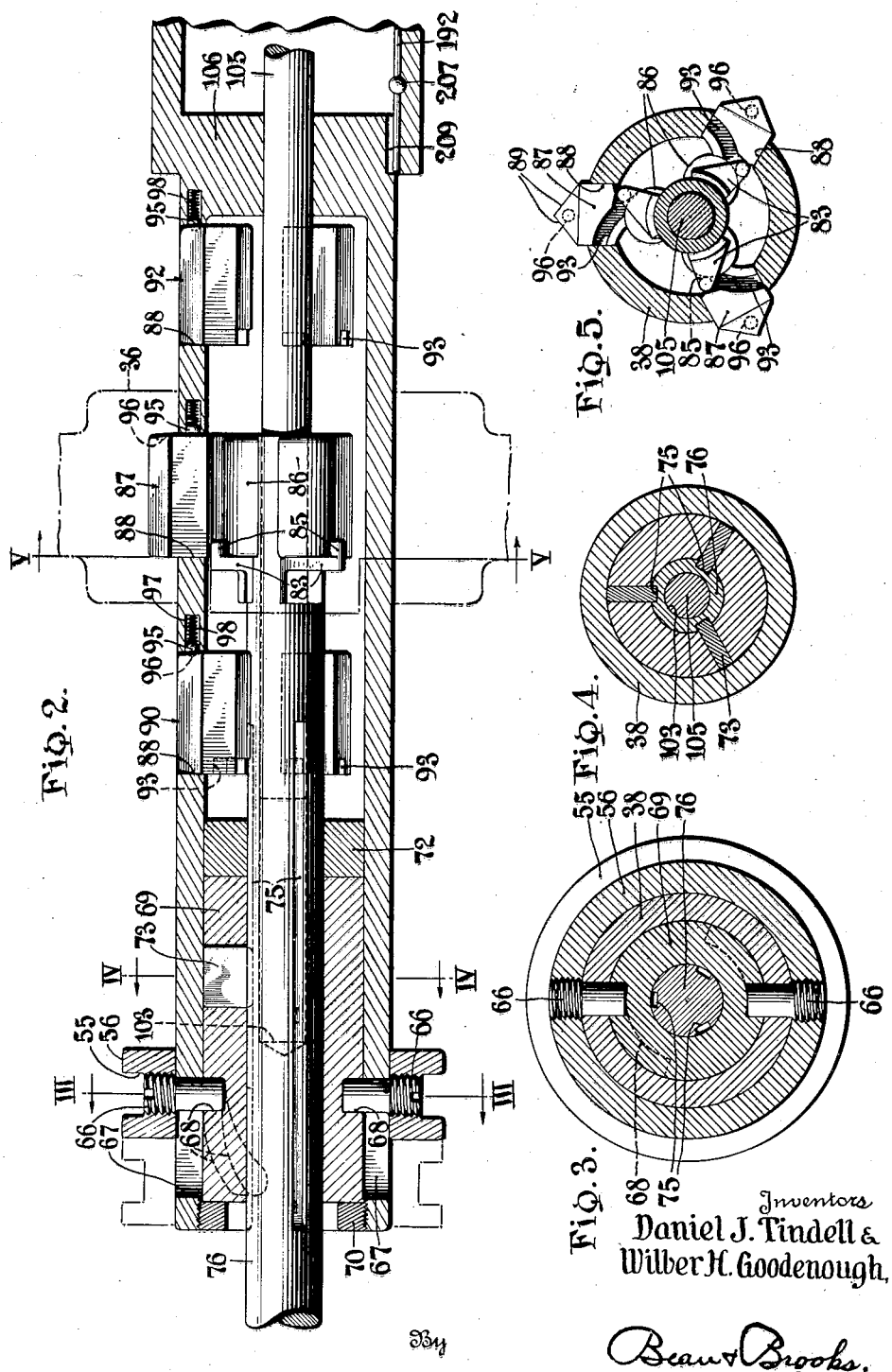

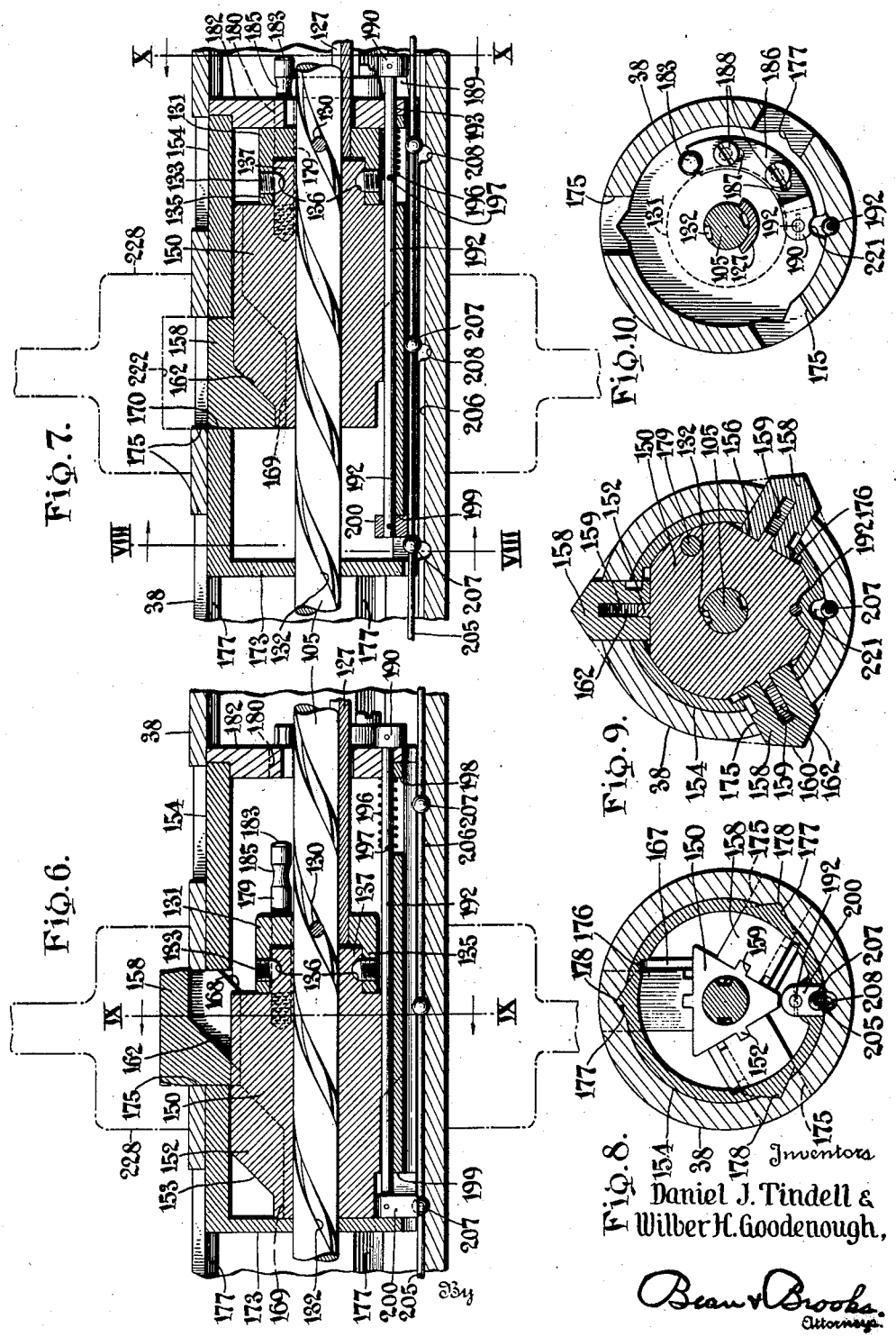

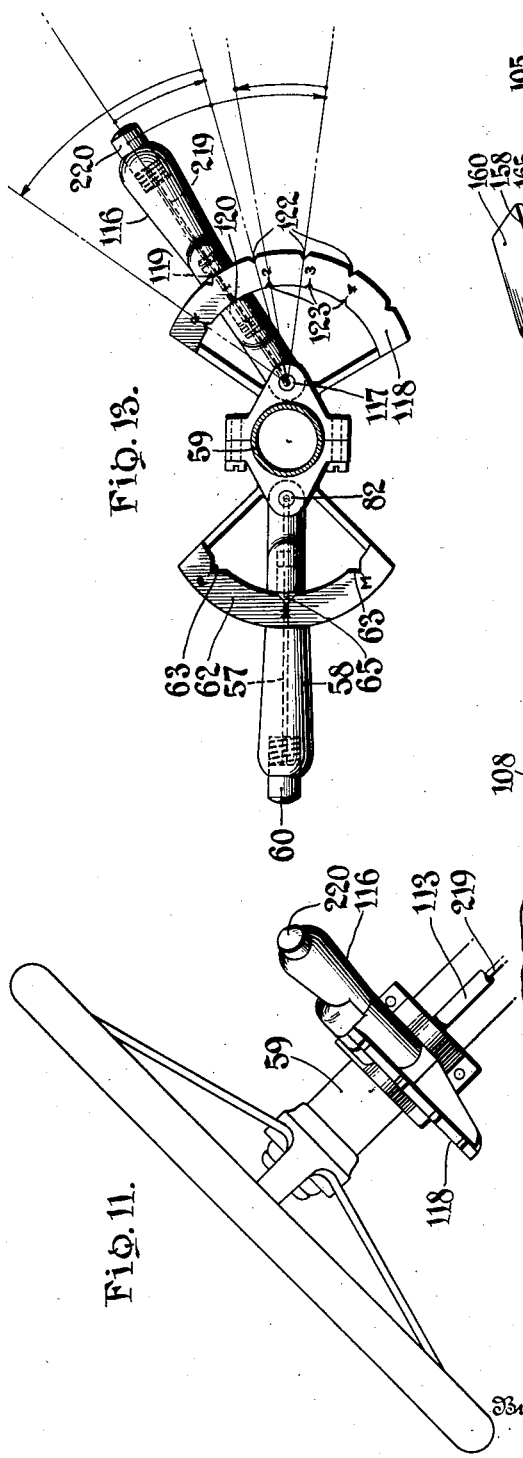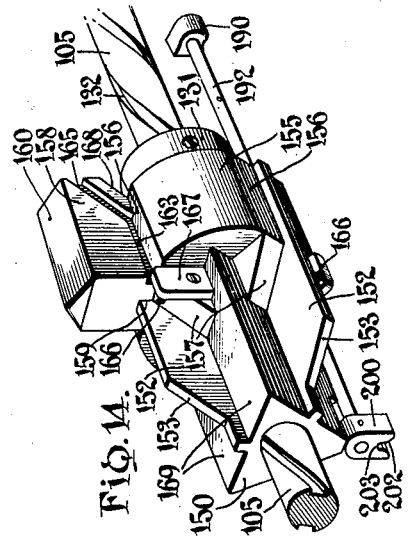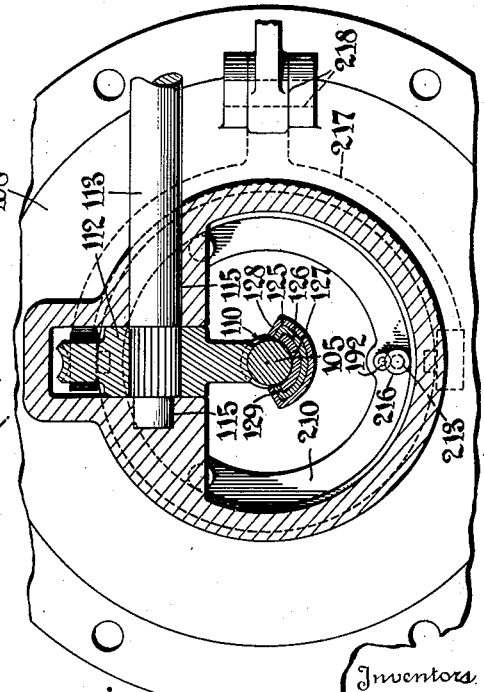

1,969,436

UNITED STATES PATENT OFFICE

1,969,436

CLUTCH MECHANISM FOR MULTIPLE GEAR CONSTANT MESH TRANSMISSION

Daniel J. Tindell and Wilber H. Goodenough, Buffalo, N. Y.

Application May 15, 1933, Serial No. 671,191

5 Claims. (Cl. 192—71)

This invention relates to speed changing devices and it has particular relation to a multiple gear constant mesh transmission designed especially for installation in automotive vehicles and industrial machinery.

One object of the invention is to provide a variable speed gear in which all of the working parts are positive in their action and not dependent on springs or friction for their operation, and in which all of the working parts are easily replaceable and simple in construction.

Another object of the invention is to provide a transmission in which all of the gears are in constant mesh at all times, and in which speeds may be changed by slight straight forward or backward movement of a lever located in a convenient location, for example, upon the steering post of a vehicle.

All of the transmission gearing embodied in the invention is contained in a housing or casing of sufficient size to enclose the gears necessary to produce the number of shifting stages that may be desired for any particular type of vehicle. A transmission structure including a driving shaft and a driven shaft arranged in substantially axial alignment are provided with connecting means to a supplemental or intermediate transmission shaft arranged parallel to the driving and driven shafts, the auxiliary shaft being hollow for receiving gear shifting elements necessary to produce the various gear ratios desired in operating a motor vehicle. The transmission further includes primary and secondary speed changing gears in any desired number depending upon the size of the transmission and the use to which it is to be put.

In the drawings:

Fig. 1 is a vertical section through the complete transmission structure showing the arrangement of the parts thereof;

Fig. 2 is a vertical section, on a larger scale, through a portion of the transmission structure for controlling sets of the primary gears;

Fig. 3 is a cross section taken substantially along line III—III of Fig. 2;

Fig. 4 is a cross section taken substantially along line IV—IV of Fig. 2;

Fig. 5 is a cross section taken substantially along the line V—V of Fig. 2;

Fig. 6 is a vertical section, on a larger scale, through a portion of the device and showing a shifting cage in its operative position for transmission of power;

Fig. 7 is a view similar to Fig. 2 showing the shifting cage in a neutral position;

Fig. 8 is a cross section through the shifting cage taken substantially along the line VIII—VIII of Fig. 7;

Fig. 9 is a cross section through the shifting cage taken substantially along the line IX—IX of Fig. 6;

Fig. 10 is a cross section taken substantially along line X—X of Fig. 7;

Fig. 11 is a fragmentary elevation showing the position of control levers with respect to a vehicle steering wheel;

Fig. 12 is a fragmentary cross section taken substantially along the line XII—XII of Fig. 1;

Fig. 13 is a plan of lever control members for effecting gear shifting operations and mounted upon the vehicle steering column shown in section; and Fig. 14 is a perspective of a cam block or shifting unit with the cage omitted.

In practicing the invention a transmission housing or casing 20 is provided for receiving a driven shaft 22 connected to a suitable machine or vehicle axle (not shown) to be operated and has bearings 23 and 25 in the outer casing wall and in an intermediate bearing support 26 of the casing, respectively. Transmission gears 28, 29 and 30 different in diameter, are rigidly secured upon an inner end portion of the shaft 22 between the bearings 23 and 25, by means of a key or spline connection 32, and are further held against axial movement by the bearing 23 and bearing support 26. These gears intermesh with gears 35, 36 and 37 respectively, also different in diameter, to complete a series of sets or pairs of gears, each pair being in constant mesh. The gears 35, 36 and 37 are mounted upon a hollow cylindrical shaft 38 that is journalled in bearings 39 at opposite sides of the housing 20 and is provided with an intermediate bearing 50 in the bearing support 26. In order to maintain the gears 35, 36 and 37 in proper alined position with the gears 28, 29 and 30, they are closely but rotatably confined between the bearing 39 at one end of the housing and the intermediate bearing support 26.

At one end portion of the hollow shaft adjacent the bearing 39, a shifting yoke 52 (Figs. 1 and 2) which is non-rotatable with respect to the hollow shaft is provided with radially inwardly projecting pins 53 rigidly secured therein with their inner ends flush with the bottom of an outer annular groove 55 of a collar 56 for operating the latter. This yoke is connected through the medium of a wire 57 to a lever 58 pivoted upon a steering post or column 59 of an automotive vehicle and is actuated by pressing a button 60 slidably mounted in the end of the lever. A sector or segmental arcuate bracket 62 also carried by the steering post is provided with notches 63 which are engaged by a detent 65 yieldably carried by the lever.

Cam pins 66 (Fig. 2) are screw-threaded radially inwardly through the collar 56 with their outer ends flush with the bottom of the groove 55 and their inwardly projecting ends extending through slots 67 disposed in an axial direction or longitudinally in the cylindrical wall of the hollow shaft 38. Cam grooves 68 formed in the outer circumferential portions of the shifting core 69 are engaged by the end of the pins 66 and are helical in form, although occupying only segments of helices of sufficient extent to cause relative rotation of the hollow shaft and shifting core through an angle of 60 degrees when the cam 66 is moved from one end of the slot 67 to the other. An annular plug 70 screw-threaded into the end of the shaft 38 abuts the outer end of the shifting core 69, and a second annular plug 72 rigidly mounted inside the shaft serves as an abutment for the inner end of the core 69. Intermediate portions of the core are provided with keys 73 which slidably engage keyways 75 in a rod 76 that is axially movable relative to both the core and the hollow shaft.

The outer end of the rod 76 is provided with a collar 77 rigidly mounted thereon and a yoke 78 having fingers 79 engaged in an annular groove 80 to provide for axial movement of the rod regardless of whether or not the shaft 38 is rotating. An actuating member 82 leads from the yoke to the lever 58 and the yoke is operable to move the rod by actuating the lever.

The inner end portion of the rod 76 has a series of radially disposed arms 83 rigidly mounted thereon and is provided with integral cam fingers 85 extending in an axial direction beyond the adjacent edges of a series of partially cylindrical guide lugs 86 formed integrally at the end portion of the rod and spaced about the rod at intervals of 120 degrees. As best shown in Fig. 5, the outer surfaces of these cylindrical lugs are adapted to contact complemental rounded inner surfaces of a series of dogs 87 that are movable radially inwardly and outwardly through slots 88 in the cylindrical wall of the shaft 38 and are further provided with outer oppositely beveled faces 89. These dogs are also spaced about the axis of the shaft 38 at intervals of 120 degrees.

Three sets of dogs 87, 90 and 92 are disclosed in this embodiment of the invention, and since their structure and operation are identical, the same reference characters are employed for designating the details of each. Cam grooves 93 in the dogs are adapted to receive the cam fingers 85 of the radial arms 83, and when the rod 76 is turned relative to the shaft 38 through an angle of 60 degrees in a counter-clockwise direction, as viewed in Fig. 5, the dogs are drawn inwardly to follow the outer cylindrical guiding surface of the lugs 86. At the conclusion of this movement, the inner extremities or surfaces of the dogs fit between the lugs 86 against the surface of the rod 76 and their outer extremities defined by the beveled faces 89 are flush with the circumference of the shaft 38.

Each dog is yieldably held in its inward position by means of a ball 95 that engages in this position into a recess 96 in the end face of each dog and is mounted in a recess 97 formed in the wall of the shaft 38. A compression spring 98 mounted under compression in the recess 97 urges the ball constantly against the end surface of the dog to snap the ball into the recess 96 when the dog is in its inward position.

Recesses 99, 100 and 101 formed along the inner bearing surfaces of the gears 35, 36 and 37, respectively, are adapted to register with the three sets of dogs 90, 87 and 92 which are selectively engageable therein through the slots 88 in the cylindrical shaft wall. In other words, the power to the driven shaft can be transmitted selectively through the medium of any pair of gears 28—35, 29—36 or 30—37, depending upon the position of the cam fingers 85 and lugs 86 that are movable axially in the shaft by movement of the actuating lever 77 after the rod 76 has been rotated through an angle of 60 degrees by the operation of the core 69. For the sake of convenience the pairs of gears 28—35, 29—36 and 30—37 are referred to as driven gears.

The inner end portion of the rod 76 is provided with a central or axial bore 103 for slidably and rotatably receiving one end portion of a smaller rod 105, an intermediate portion of which is journalled in a transverse partition 106 formed in an intermediate portion of the hollow shaft 38. The other or outer end portion of the rod 105 is mounted in a bearing 107 of a housing section 108 secured, as indicated at 109, to the principal housing 20.

As best shown in Figs. 1 and 12, a worm 110 formed on the rod 105 inside the housing section meshes with a gear 112 that is carried rigidly upon an actuating shaft 113 journalled, as indicated at 115, in the housing section. This rod is connected for rotation within predetermined limits by actuating a lever 116 that is rotatably mounted, as indicated at 117, upon the steering post 59, and an arcuate segmental graduated bracket 118 is also mounted rigidly upon the steering post for engagement with detents 119 and 120 of the lever that are engageable in notches 122 and 123, respectively, on opposite sides of the arcuate bracket 118. The lever 116 is connected to the actuating shaft 113 for rotation thereof concurrently with the actuation of the lever.

A portion of the journal bearing 107 supports telescoping cylindrical segments 125, 126 and 127 that are extensible longitudinally along the rod 105 in slightly spaced relation thereto. The outer cylindrical segment 125 which serves as a support for the other segments is anchored in the bearing 107. Inwardly turned flanges 128 and 129 of the cylindrical segments 125 and 126, respectively, provide for proper nesting of the segments in their telescoping relation. The inner end of the segment 127 is rigidly secured to a collar 131 surrounding the rod 105.

Pins 130 projecting rigidly from the inner circumference of the collar 131 engage in a pair of helical grooves 132 formed with relatively high pitch in the rod 105, and a pair of trunnions 133 rigidly mounted in an annular flange 135 of the collar are disposed inwardly in an annular groove 136 formed in a reduced end portion 137 of a cam block 150 to provide for relative rotation between the collar 131 and the cam block. The rod 105 projects axially through the cam block in slidable and journalled relation. As best shown in Figs. 6 and 14, a plurality of radial flanges 152 formed integrally upon the cam block are provided with cam faces 153. One end portion of the cam block is in the form of a body 155 providing outer cylindrical surfaces slidably engaging the inner cylindrical surface of a shifting cage 154 and is formed with flattened portions 156 from which the outer edges of the flanges project. This body is likewise provided with cam faces 157 spaced from the cam faces 153 and parallel, respectively, to the latter. Driving dogs 158 mounted upon the cam block are provided with inner central guiding grooves 159 that fit upon the flanges 152 and are further provided with outer beveled faces 160. Outwardly inclined cam surfaces 162 defined by the inside surface of the grooves 159 in the dogs are adapted to slide upon the cam surfaces 153. These dogs 158 are also provided with side grooves 163 having inclined cam groove portions 165 that are aligned with fingers 166 projecting rigidly from brackets 167 rigidly secured to the cam block. A cam surface 168 adjacent the extremity of each dog is substantially parallel to the cam groove portions 165.

In the relative movement of each dog 158 upon the cam block, to the left, as viewed in Fig. 14, from its position upon the flat surface 156, the finger 166 travels along the groove 163 until it reaches the inclined cam portion 165 and by further relative movement, the dog is drawn inwardly radially by the pin until it rests upon inner flat surfaces 169 of the cam block. In the opposite relative movement of these members the cam faces 153 and 157 contact the cam faces 162 and 168, respectively, to move the dog radially outwardly to the position shown in Figs. 6 and 14.

Slots 170 in the wall of the cylindrical shifting cage 154 are so positioned that the dogs always remain at least partially therein and are adapted to be moved outwardly therein when the cam block is moved from its position shown in Fig. 7 toward the inner wall 173 of the cage. Similar slots 175 in the wall of the hollow shaft 38 register with the slots 170 in a number of relative positions of the cage and shaft. Although the cam block is axially slidable in the shifting cage 154, it is prevented from relative rotation therein by means of the dogs 158 portions of which always remain in the slots 170, and by means of the brackets 167 which travel in the grooves 176 in the inner surface of the cage. Longitudinal grooves 177 formed in the inner wall of the hollow shaft 38 slidably receive spline members 178 (Fig. 8) projecting integrally from the outer surface of the cage to insure concurrent rotation of the shaft and cage, but permitting relative longitudinal sliding movement when the cage and shaft 38 are not locked together by the dogs 158.

One end of a pin 179 that is rigidly screw-threaded into the cam block 150 adjacent the collar 131 extends in an axial direction, and in the position of the cam block as shown in Fig. 7, it extends through an opening 180 in the end wall 182 of the cage 154. In moving it to this position from the position shown in Fig. 6, an outer head 183 of the pin, which is slightly rounded and formed with an annular groove 185, engages a cam bar 186 having slots 187 therein for guiding it upon screws 188 mounted in the end cage wall 182. This cam bar has at its end opposite the head a cam face 189 that actuates a head 190 rigidly secured upon the end of a rod 192 to move the latter longitudinally to the right, as viewed in Figs. 6 and 7, in an opening 193 in the cage wall 182 and in a bearing recess 195 formed between adjacent contacting walls of the cage and cam block 150. An intermediate portion of the rod 192 has a coil spring 196 surrounding it and connected thereto at one end, as indicated at 197. The other end of the spring abuts the inner surface of the wall 182 and resists movement of the rod to the right. A slot 198 in the wall of the cage provides access to the spring, and a second slot 199 at the other end of the case slidably receives a lug 200 that is secured to the end of the rod opposite the block 190. It will be observed that the length of the slot 199 is at least twice the thickness of the lug 200.

A recess 202 in the lower surface of the lug 200 has a relatively narrow inner portion 203 flared outwardly at its mouth to receive a stiff wire 205 which normally is disposed in a groove 206 formed longitudinally in the inner wall of the hollow shaft 38. A plurality of balls 207 formed integrally at intervals upon the wire normally are disposed in recesses 208 communicating with the groove 206 and constituting enlarged portions thereof. The outer extremites of lug 200 defined by the recess 202 straddle the wire and the recess 202 registers with or receives the wire. When the wire is in the groove 206 and the balls 207 are in the recesses 208, the flared mouth of the recess 202 can be moved over one of the balls without striking it. In this position the lug 200 normally covers one of the balls and prevents the wire from being accidentally displaced. It is only when the cam face 189 actuates the head 190 of the rod 192 to its position shown in Fig. 7 that the wire 205 and balls 207 can be displaced from the groove 206. However, if the wire is moved to the position shown in Fig. 7 longitudinal movement of the rod 192 and lug 200 to the left causes abutting contact of the lug against one of the balls.

As best shown in Figs. 1 and 2, the inner end of the wire 192 is disposed in a recess 209 of the hollow shaft, and the other end is connected to an annulus 210 having an outer annular groove 212 and a series of headed pins 213 supported in the end of the hollow shaft 38. The annulus is slidable axially upon the pins 213 and is constantly urged toward the end of the shaft by means of springs 215 having their opposite ends abutting the annulus and heads 216 of the pins.

A yoke 217 pivoted, as indicated at 218, upon the housing 108 is connected to the steering post lever 116 by means of a wire 219 through which the yoke is operable by pressing a button 220 slidably mounted in the end of the lever. In order to provide movement of the wire 192 and balls 207 out of the groove 206, the annulus 210 is actuated outwardly and the balls 207 then ride outwardly against the walls of the recesses 208. A complemental groove 221 registering with the groove 206 is formed along the lower circumferential portion of the cage 154 and provides space for displacement of the balls from the recesses 208.

Referring to Figs. 1 and 6 to 10, the slots 175 of the hollow shaft are alined to register with recesses 222 in drive gears 225, 226, 227 and 228, and a reversing gear 229. The walls of the recesses 222 are beveled to conform to the beveled faces 160 of the dogs 158, and the beveling begins at the inner bearing surface of each gear, as indicated in broken lines on opposite sides of the dogs 158 shown in Fig. 9. The dogs 158 are movable into engagement into the recesses in any one of these gears to drive it individually. A series of gears 230, 231, 232 and 233 of different sizes supported rigidly upon a drive shaft 234, mesh with different size gears 225, 226, 227 and 228 respectively, and the reversing gear 229 meshes with an intermediate gear 235 which in turn meshes with a gear 236 rigidly secured upon the drive shaft 234. A suitable journal member 237 carried by the bearing support 26 rotatably supports the intermediate gear 235. One end of the drive shaft 234 is journalled in the bearing 25 and it has an intermediate journal bearing 238 in the wall of the housing 20 opposite the bearing 23. This shaft is adapted to be connected in any suitable manner to a suitable source of power (not shown). For the sake of convenience, the pairs of sets of gears 225—230, 226—231, 227—232, 228—233, and the reversing gears 229—236 are referred to as drive gears.

In the operation of the transmission gearing described above, it will be observed that each engaging pair of intermeshing gears is arranged for constant intermeshing relationship, and that the driving and control of each pair of gears is effected by operating the mechanism contained inside the hollow shaft 38. After power has been applied to the drive shaft 234 to begin rotation thereof, and the various parts are in the operating position indicated in Fig. 1, the three pairs of gears 28—35, 29—36 and 30—37, are continuously rotated and the dogs 87 (Figs. 1 and 2) are disposed through the slots 88 into the recesses 100 of the gear 36. If it is desired to change the gear ratio by transferring the driving force from the gears 29—36 to either of the other pairs of gears 28—35 or 30—37, the collar 56 is moved to the broken line position (Fig. 2) thus providing relative rotation of the shaft 38 and the core 69 through an angle of 60 degrees without interfering with the rotation of the shaft 38. This actuation through the rod 76 rotates or moves the cam fingers 85 along the cam grooves 93 in a counter-clockwise direction, as viewed in Fig. 5, to draw the dogs 87 radially inwardly until the beveled faces 89 are within the peripheral outline of the shaft 38. So far as concerns the transmission of power from the intermediate shaft 38 to the driven shaft 22, the gears 28—35, 29—36 and 30—37 are then in neutral relation and the collar 56 can be secured in this position if it is so desired for as long a period as necessary.

In connecting any of the gears to be rotatably driven by the shaft 38, the rod 76 which is slidable in the core 69 is axially moved by actuating the yoke 78. In the movement of the cam arms 83 in a counter-clockwise direction through an angle of 60 degrees from the position shown in Fig. 5, each of these arms is then positioned between adjacent inwardly drawn dogs 87 and are movable longitudinally either inwardly or outwardly to a like position either between the dogs 90 or between the dogs 92. Then by movement of the collar 56 back to its original position, as shown in Fig. 5, the dogs are moved radially outwardly to engage the gear with which they then register. It will be apparent that the transmission of power to the shaft 22 from the shaft 38 is a matter of selection with respect to the positive connection of any of the pairs of gears through the medium of any of the sets of dogs 90. 87 or 92.

Assuming the parts of the transmission to be in the relationship shown in Figs. 1 and 6, in transmitting power to the intermediate shaft 38 from driving shaft 234, the dogs 158 extending through the slots 170 and 175 positively engage the gear 228 in the recesses 222 for transmission of power through the gear 233 from the driving shaft. When it is desired to change the gear ratio by transmitting the power through the pair of gears 227—232 from the driving shaft, the worm gear 112 is actuated to rotate the helically grooved rod 105. A predetermined degree of rotation of this rod causes the pins 130 to travel in the helical grooves 132 and since the collar 131 is non-rotatable while the hollow shaft 38, together with the shifting cage 154, is rotatable as a unit, the pins 133 draw the rotating cam block 150 with the collar until the pin 179 is extended through the opening 180 and engages the end of the cam bar 186 to cause the latter to snap into the groove 185 of the pin. The cam block 150 and the cage 154 are then temporarily and yieldably held together as a unit by the pin 179 and cam bar, and further turning of the helically grooved rod 105 moves the cage 154 and block 150 concurrently. During the movement of the cam block 150, as just described, the inner surface of the dog 158 slides upon the surface 156 of the cam block and the pins 166 engage the cam slots 163 and 165 progressively to draw the dogs inwardly until their outer surfaces are within the peripheral boundary of the shaft 38. It is only after this operation that the cage 154 and block 150 can be moved concurrently, or otherwise along the rod 105. Further rotation of the rod 105 in either direction moves the cage 154, together with the cam block, until it registers with the opening 222 in one of the gears 225, 226, 227 or 229.

In order to insure proper registering of the dogs 158 with the slots 170, 175 and the recesses 222 for any of these gears, the cage is moved to a position slightly to the right of any of these slots, the position of which can be determined by suitable graduations, such as the notches disclosed on the arcuate bracket 118, and then the yoke 212 and annulus 210 are actuated to draw the wire 205 outwardly until the balls 207 ride outwardly on the walls of the recesses 208 to the position shown in Fig. 7. With the balls held in this position the rod 105 is rotated to move the gear shifting cage 154 to the left as viewed in Fig. 7 and the lug 200 will then be stopped, after compressing the spring 196, by one of the balls 207 according to the location of the gear within which it is desired to insert the dogs. While the lug 200 is abutting the ball 207 to prevent further movement of the cage, the rod 105 is further rotated in the same direction to move the cam block 150 inside the cage to the left, as viewed in Fig. 7, thereby releasing the head of the yieldably held pin 179 from the cam bar 186 and causing the cam faces 162 and 168 of the dog to ride outwardly upon the cam faces 153 and 157 of the cam block. Thus driving engagement of the shaft 38 with the gear is provided through the dogs 158 as they enter the recesses 222.

The same kind of operation is provided to reverse the direction of rotation of the intermediate shaft 38 and driven shaft 22 by engaging the dogs in the same manner with the recesses 222 of the reversing gear 229. It is of course to be understood that the gears are in neutral relation when the cam block 150 has withdrawn the dogs 158 from the recesses 222 to the position indicated in Fig. 7. After the dogs have been engaged with any of the gears as described the yoke 212 is actuated back to its original position as shown in Fig. 1 to return the balls 207 and wire 205 into the groove 206 and recesses 208 and the rod 192 is released to resume its position as shown in Fig. 6 under the influence of the spring 196 whereby the lug 200 covers one of the balls 207 and thus prevents accidental displacement of the wire and balls from the groove 206 and recesses 208.

From the foregoing description it will be apparent that power can be transmitted to the driven shaft 22 from the drive shaft 234 in such manner that three changes of speed can be effected through each pair of gears 28—35, 29—36 and 30—37 and that each of these pairs of gears has selective driving connection to any of the pairs of gears 225—230, 226—231, 227—232, 228—233 and the three reversing gears 229—235—236. Hence, the construction provides for at least twelve speeds forward and three speeds in reverse. Since all of the engaging gears are constantly in mesh including those arranged in pairs together with the three gears 229, 235 and 236 for reversing the rotation of the shaft 234, it will be apparent that these various changes in gear ratio may be accomplished without the use of the clutch, with the possible exception that the clutch should be used when starting the mechanism or when the reverse gears are used. During the operation of the transmission the hollow shaft 38 is rotating and all of the gears are likewise rotating, although the several pairs of meshing gears are rotating at different rates.

It is to be understood that the gears 28—35, 29—36 and 30—37 can be omitted and the shaft 38 can be considered as the driven shaft adapted to be geared directly to a machine or vehicle axle (not shown) to be operated.

In the description included herein, it is assumed that the source of power is applied to the drive shaft 234, but it is apparent that a suitable source of power can be applied to the shaft 22 which can be considered the drive shaft. Conversely, the shaft 234 is adapted to serve as a driven shaft to be applied to any mechanism or apparatus to be operated through the transmission.

Although only one form of the invention has been shown and described in detail, it will be apparent to those skilled in the art that the invention is not so limited, but that various changes may be made therein without departing from the spirit of the invention or from the scope of the appended claims.

What is claimed is:

1. In a transmission structure, a hollow rotatable shaft having openings communicating radially with the interior of said shaft, a carriage movable inside and axially of the shaft, gear engaging means slidably carried by the carriage and movable outwardly through said openings, control mechanism slidable in said carriage for actuating said gear engaging means independently of the rotation of the shaft, said gear engaging means and mechanism having engaging portions operable to move the gear engaging means positively inwardly or outwardly depending upon the direction of movement of said mechanism, and means carried by the shaft and movable into and out of the path of movement of said carriage for registering the gear engaging means with said openings.

2. In a transmission structure, a hollow rotatable shaft having openings communicating radially with the interior thereof, a carriage movable inside and axially of the shaft, gear engaging dogs carried by the carriage and movable outwardly through said openings, a control member slidable in said carriage for actuating said dogs, operating means extending axially into the shaft for axially moving said control member in the carriage, a device for yieldably anchoring said member in a predetermined position in said carriage, means for stopping the carriage at predetermined positions in said shaft, and cooperating with said operating means for releasing said member from said device.

3. In a transmission structure, a hollow rotatable shaft having openings communicating radially with the interior thereof, a carriage having openings for registering with the openings of the shaft, and movable inside and axially of the shaft, gear engaging dogs mounted in the carriage openings for selective projection through said shaft openings, a control member slidable in said carriage for actuating said dogs, said carriage having spaced portions for limiting movement of said member, actuating means extending axially into the shaft for axially moving said control member in the carriage, a device for yieldably anchoring said member to one of said portions, and means for stopping said carriage at predetermined positions in said shaft and cooperating with said operating means for releasing said member from said device.

4. In a transmission structure, a rotatable shaft having an internal chamber, a carriage slidably mounted in said chamber, gear engaging dogs movable outwardly from the carriage into gear engaging relation, means slidably carried by said carriage for controlling the gear engaging means independently of the rotation of the shaft, and a member movable in the chamber into the path of movement of said carriage to stop the latter at a predetermined position.

5. In a transmission structure, a rotatable shaft having an internal chamber, a carriage slidably mounted in said chamber, gear engaging dogs movable outwardly from the carriage into gear engaging relation, means slidably carried by said carriage for controlling the gear engaging means independently of the rotation of the shaft, and an elongate member having a plurality of stops thereon movable into the path of movement of said carriage for selective positioning of said carriage.

DANIEL J. TINDELL.
WILBER H. GOODENOUGH.